OR  4,050,783

United States Patent
Tardy

[11] 4,050,783
[45] Sept. 27, 1977

[54] CONNECTOR FOR AN OPTICAL FIBRE LINK

[75] Inventor: André Tardy, St. Germain les Arpajon, France

[73] Assignee: Compagnie Generale d'Electricite, Paris Cedex, France

[21] Appl. No.: 587,785

[22] Filed: June 17, 1975

[30] Foreign Application Priority Data

June 20, 1974  France .................. 74.21506

[51] Int. Cl.² .............................. G02B 5/14
[52] U.S. Cl. .................................. 350/96 C
[58] Field of Search ............. 350/96 C, 96 B, 96 BC, 350/96 R

[56] References Cited

U.S. PATENT DOCUMENTS

| 3,430,057 | 2/1969 | Genähr | 350/96 B |
| 3,734,594 | 5/1973 | Trambarulo | 350/96 C |
| 3,864,018 | 2/1975 | Miller | 350/96 C |

Primary Examiner—John K. Corbin
Assistant Examiner—Stewart Levy
Attorney, Agent, or Firm—Sughrue, Rothwell, Mion, Zinn and Macpeak

[57] ABSTRACT

The invention concerns a connector for optical fibre telecommunication system. The fibres of each of the cables to be connected are held in channels formed between cylindrical holding rods clamped together, one of the sets of holding rods being surrounded by guide rods which extend towards the other set of holding rods so as to ensure the guiding of the latter at the time when the connection is made.

14 Claims, 5 Drawing Figures

CONNECTOR FOR AN OPTICAL FIBRE LINK

This application relates to application Ser. No. 587,773 filed on June 17, 1975, now U.S. Pat. No. 3,989,567 entitled "Connection Method for Two Optical Fibres Having the Same Diameter" by Andre Tardy and assigned to the common assignee.

BACKGROUND OF THE INVENTION

1. FIELD OF THE INVENTION

The invention concerns a connector for an optical fibre link.

2. DESCRIPTION OF THE PRIOR ART

The foreseeable development of telecommunications by guided optical waves makes it desirable to produce devices making it possible to connect together two optical fibres with coupling losses which are as low as possible, for example less than 1 db. If the fibres have, for example, a core with a diameter of 100 microns surrounded by a casing having a lower optical index, with a difference in index comprised between $5-10^{-3}$ and $10^{-1}$, these devices must then allow the positioning of the fibres in the following conditions: the distance between the ends facing the fibres must be less than 20 microns; the relative excentricity must be less than 4 microns; the relative inclination must be less than 1°. In the case where an adaptation of the index of the medium separating the two fibres is effected, these tolerances become greater: 50 microns for the distance and 10 microns for the excentricity, the inclination being unchanged. Taking into account the slight diameter of the fibres, these tolerances are difficult to keep to.

The solutions proposed up to this day are very few and are generally related to laboratory installations.

The article by D. SCHICKETANZ, "Connectors for multimode fibres" (Siemens Forschung; Entwickl Ber. Bd 2, (1973) No. 4) proposes a connection between fibres through a glass capillary tube, which is swaged over a given length with an inside diameter slightly greater than the outside diameter of the fibre. The capillary tube, having an index close to that of the casing of the fibre, contains either a liquid or a solid element, having an index close to that of the core of the fibre. The main characteristic is that the connector is itself an optical wave guide.

According to the article by C. G. Someda, "Simple, Low-loss joints between single-mode optical fibers" (Bell System Technical Journal Vol. 52 No. 4, April, 1973), the alignment between the optical fibres is effected by means of a groove obtained by swaging a methyl polymethacrylate sheet by means of a fibre having the same diameter.

According to French Pat. No. EN 73 11 188 applied for on 28th Mar., 1973, by WESTERN ELECTRIC COMPANY, INCORPORATED, for a "Device for connecting optical fibres", connecting being effected by deformation of a silicone elastomer web, which is drilled with a hole in which the fibres are engaged. Blocking is effected by pressure on two plates placed on either side of the web. The supposed result is the simultaneous aligning and immobilizing of the fibres.

The article by Frank L. Thiel, Roy E. Love, Rex L. Smith, "In line connectors for multimode optical waveguide bundles" (Applied optics, Vol. 13, No. 2, February, 1974, page 240) proposes a connector structure between two cables each comprising a compact hexagonal stacking of the fibres in a casing having a corresponding hexagonal inside cross-section. The aligning of the fibres results from the aligning of the casings of the two cables.

None of these documents makes it possible to ensure the aligning of the optical fibres to be connected in a way which is simultaneously simple and sufficiently accurate.

The aim of the present invention is to produce a connector for optical fibre link making it possible simply to obtain a particularly great accuracy in the position of the fibre to be connected.

SUMMARY OF THE INVENTION

It has as its object a connector for optical fibre link comprising:

At least one optical fibre constituting a light guide;

And guiding means for guiding an end section of that fibre up to a position ensuring the connecting thereof to an other optical element;

Characterized in that it comprises, moreover, at least three holding rods which have the shape of cylinders of revolution;

And clamping means for keeping these holding rods parallel to one another and in contact by their lateral surfaces, forming together, a holding channel limited by the adjacent portions of the lateral surfaces of these rods;

The said end section of the fibre being arranged in the holding channel, these clamping means providing the contact of all these rods with that fibre without substantially deforming the latter;

The said guide means acting on the said holding rods whereby the said fibre can be guided accurately and without any danger of damage up to the position ensuring the connecting thereof to the said outher optical element.

By means of the accompanying diagrammatic FIGS. 1 to 5, several embodiments of the invention have no limiting character will be described hereinbelow.

Corresponding elements in several of these figures are designated therein by the same references symbols.

DESCRIPTION OF PREFERRED EMBODIMENTS

Figure 1:
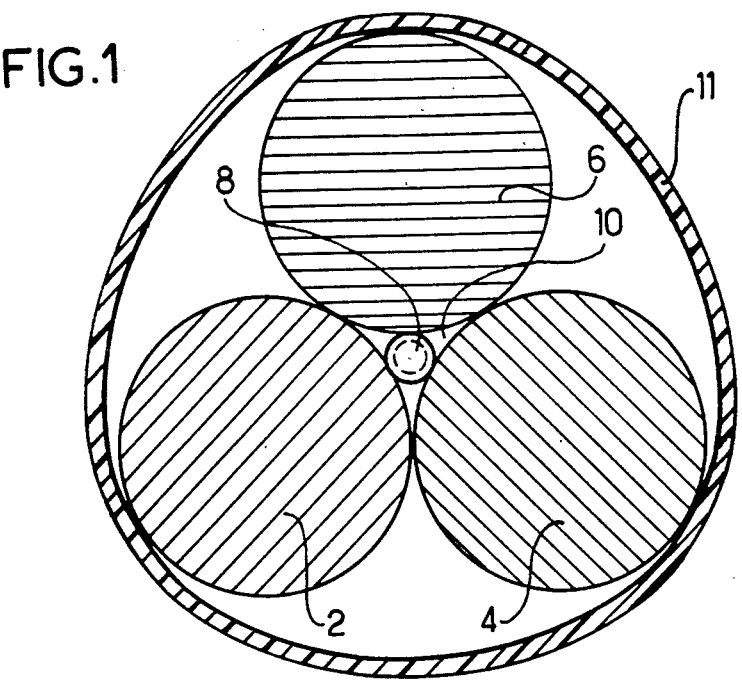
FIG. 1 is a cross-section view, through a plane perpendicular to the axis of the connector, of a portion of a connector for one fibre, according to the invention, that portion not comprising the guiding means.

The portion of connector shown in FIG. 1 comprises three rods in the shape of cylinders of revolution 2, 4 and 6, made of hard steel having a diameter of 646 microns and a length of a few centimeters. The axes of the three rods are parallel to one another and perpendicular to the plane of the sheet on which they are arranged at the three apexes of an equilateral triangle. Three circles representing the cross-section of these rods through the plane of the sheet are each tangent to the other two. A holding channel 10 is therefore formed between these three rods. It is limited by parts of the lateral surfaces of these three rods, these parts facing each other.

An optical fibre 8 having an outside diameter of 100 microns, in contact with the three rods 2, 4 and 6, is inserted in that channel. That fibre consists of a glass core surrounded by a glass casing having a lower optical index. A flexible or thermoretractable sleeve 11 surrounds the rods 2, 4 and 6 clamps them against one another and against the fibre 8.

Because of the great accuracy conventionally obtained in the manufacturing of steel rods having a circular cross-section and because of the clamping of those rods against one another, the shape of the central channel 10 is defined with great accuracy. If the diameter of the fibre 8 has a suitable value, it results therefrom that its position in relation to the rods 2, 4 and 6 is defined with great accuracy.

This has the advantage of making it possible to position a fibre such as the fibre 8, which it is difficult to manipulate because of its thinness, by acting on the outside surfaces of the assembly formed by the three rods 2, 4 and 6. That assembly is mechanically strong and its dimensions make it easy to manipulate. It may be said that it constitutes a support for the fibre 8. Its advantage in relation to other types of known supports is that it is simultaneously not expensive and very accurate, for it comprises, itself, only a particularly slight positioning error, that is to say, if that support is positioned accurately, there results therefrom an accurate positioning of the fibre 8.

In the example which has just been described, the accuracy of the positioning is due to the fact that each of the rods 2, 4 and 6 is in contact with the other two and with the fibre 8. This corresponds to a particular value of the ratio k of the diameter D of the rods 2, 4 and 6 in relation to the diameter $d$ of the fibre 8. That value is $k = D/d = 6.46$.

The ratio $k$ can, however, be raised to a value in the order of 7 without losing all the advantages of the invention. In that case, the three rods 2, 4 and 6 each remain in contact with the other two, but there exists a certain play between these rods and the fibre inserted in the holding channel. That play is slightly detrimental to the accuracy and it can be necessary for facilitating the inserting of the fibre in the holding channel 10.

The ratio $K$ can also be reduced. If is is reduced very slightly, there results only a slight flexible deforming of the fibre or of the rods. If it is greatly reduced, the three rods 2, 4 and 6 each remain in contact with the fibre inserted in the holding channel, but the contact between two of the rods 2, 4 and 6 is necessarily lost. It is preferable for one of these rods to remain in contact with the other two. On considering the triangle whose apexes are the points of intersection of the eyes of the rods 2, 4 and 6 by a plane perpendicular to these axes, such as the plane of the sheet in FIG. 1, it appears that the three angles of that triangle remain acute. If the ratio K continues to decrease while one of the rods 2, 4 and 6 is held in contact with the other two over its whole length, there comes a time when the gap between these other two rods is large enough for the fibre to be able to escape from the holding channel. One of the angles of the previously defined triangle then becomes a right-angle and the ratio K becomes equal to 2.41. It is therefore an advantage for the three angles of the previously defined triangle to remain acute and for the ratio $k$ to remain greater than 2.41.

The values of the ration $k$ with have just been given can easily be calculated by a mathematician.

It ensues from what has previously been set forth and from the fact that the invention seems to afford an advantage for positioning fibres whose diameter is comprised between 10 and 500 microns, that the diameter of the rods 2, 4 and 6 is, to great advantage, comprised between 25 and 3.500 microns.

Figure 2:
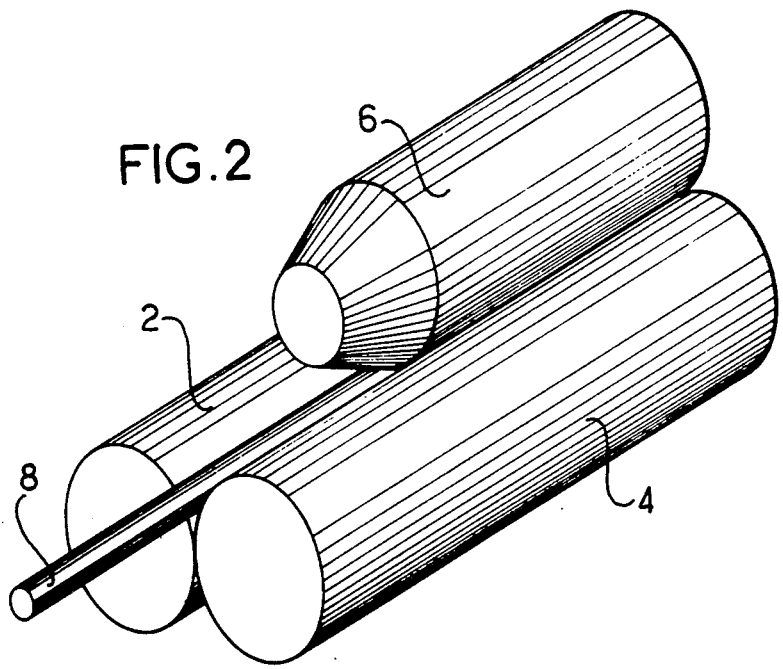
FIG. 2 is a perspective view of a portion of the device in FIG. 1.

According to FIG. 2, at least one of the ends of the rods 2, 4 and 6, of the rod 6, for example, can, to great advantage, be bevelled in the shape of a cone to make the inserting of the fibre 8 in the holding channel easier.

Figure 3:
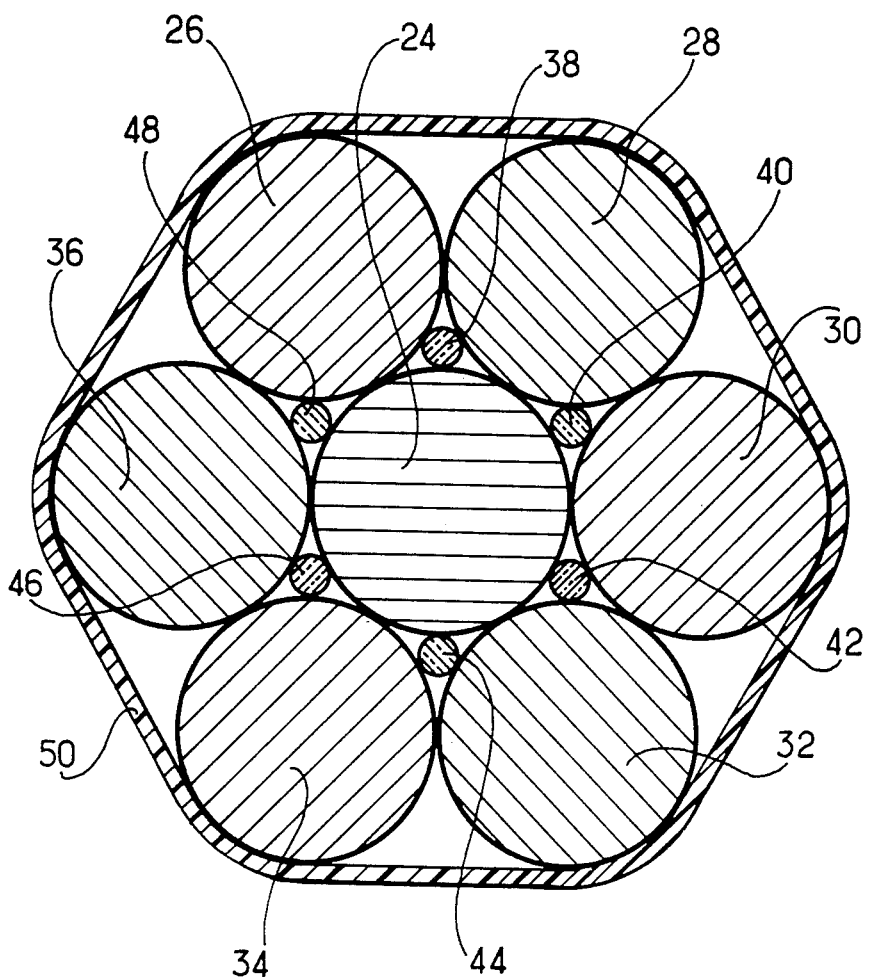
FIG. 3 is a view of a portion of a first connector having several fibres according to the invention, in a cross-section through a plane perpendicular to the axis of the connector, that portion not comprising the guiding means.

When the number of fibres having the same diameter to be positioned is greater than 1, it is not necessary, within the scope of the invention, to use as many sets of three rods as there are fibres. Certain rods can be used for positioning several fibres, it being understood that each of the channels in which the fibres are arranged is limited by three rods. All the rods have preferably the same diameter and must be parallel. Each rod can be in contact with a number of other rods which can range from two to six. Each group of three rods three times tangent two by two limits a holding channel enabling the positioning of a fibre having a suitable diameter. In the exmple shown in FIG 3, a central rod 24 is surrounded by six external rods 26, 28, 30, 32, 34 and 36, having the same diameter and being parallel, which are all in contact with the rod 24, each of these external rods being, moreover, in contact with two other external rods. Thus, six channels are limited around the central rod 24 and the six fibres 38, 40, 42, 44, 46 and 48 can be positioned in these channels with the accuracy afforded by the invention. A sleeve 50 holds the rods in place, clamping them against one another. The sleeve, which constitutes the clamping means previously mentioned, is formed by a casing of thermoretractable plastic substance which has been arranged round the external rods 26, 28, 30, 32, 34 and 36 and which has subsequently been heated so as to clamp these rods against the central rod 24.

It is quite evident that the number of the channels can be further increased by increasing the number of the holding rods used. It is then often an advantage for those rods to be arranged round an axis of symmetry which is parallel to them and which, in the example of FIG. 3, consists of the axis of the central rod 24. It is nevertheless possible for no rods to be arranged in that axix of symmetry, three holding rods then being the most central rods and being arranged at an equal distance from the axis of symmetry, in the same way as in FIG. 1, the rods 2, 4 and 6 are arranged at an equal distance from an axis of symmetry consisting of the axis of the fibre 8.

It is not necessary for the implementing of the invention for all the holding rods to have a same diameter. Nevertheless, when these rods are arranged all round an axis of symmetry, all those which are situated at a same distance from that axis, have, to great advantage, a same diameter and are angularly regularly spaced out all round that axis. Each rod which is situated at a distance from the axis of symmetry, that is, which is not a central rod such as the rod 24 in FIG. 3, then bears against the rods which are situated at an equal or smaller distance from that axis. If the rods which are the furthest from the axis are called external rods, the non-external rods act as supports for the rods which are further from that axis. According to FIG. 3, the only non-external rod consists of the rod 24 and it acts as a support for the six rods 26, 28, 30, 32, 34 and 36 which are the furthest from the axis of symmetry which is the axis of the rod 24 itself. The clamping means exert on the external rods a radial pressure, that is, a pressure directed towards the axis of symmetry. That clamping pressure is transmitted by the external rods to the rods situated at a smaller distance from the axis. Thus the cohesion of the set of rods is provided for in such a way that none of these rods can change positions in relation to the others. That cohesion is made particularly sure due to the fact that the set of rods is compact, that is to say, that there are no lost spaces.

Figure 4:
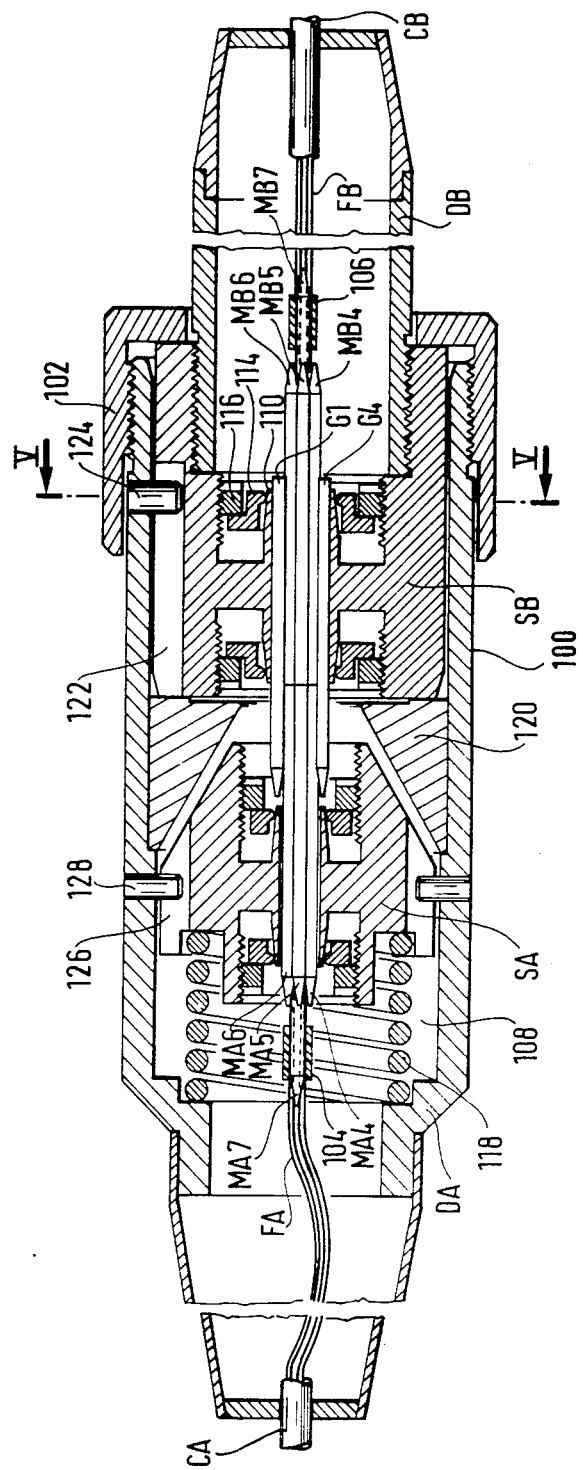
FIG. 4 is a view of a second connector having several fibres, according to the invention, in a cross-section through a plane passing through the axis of the connector.
Figure 5:
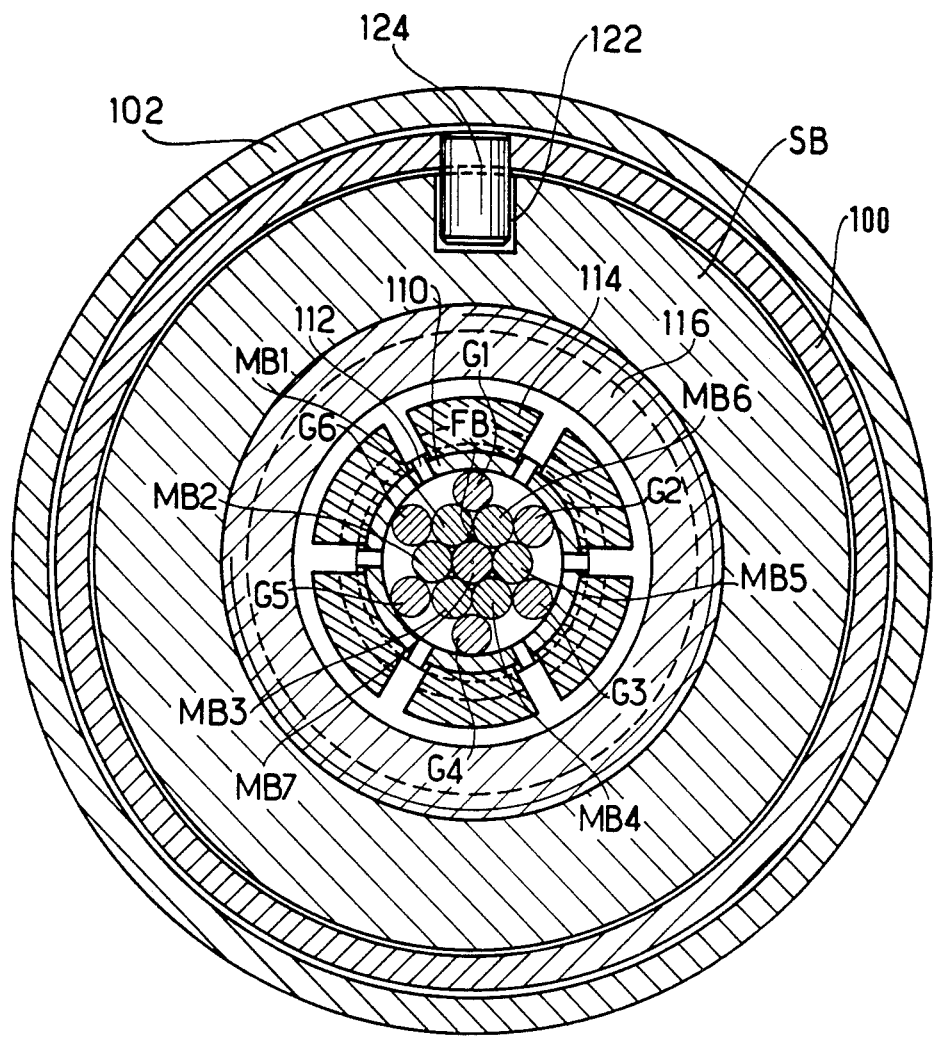
FIG. 5 is a view of the connector in FIG. 4, in a cross-section through a plane perpendicular to the axis of that connector.

The connector shown in FIGS. 4 and 5 makes it possible to ensure the connecting of one set of six optical fibres FA arranged in a resilient cable CA with a set of six optical fibres FB arranged in a resilient cable CB so that each of the fibres FA be connected up optically to a pre-determined fibre FB. It is therefore possible to transmit, by means of the cables CA and CB linked together by connector a set of six simultaneous independent data items.

The connector comprises a connector body DA and a connector body DB, both having an alongated shape and forming a body of revolution about an axis of symmetry. Each of these connector bodies comprises a cable side end and a connection side end. These connection side ends are provided with fixing means for fixing one of these bodies to the other in a detachable way by aligning the axes of symmetry without predetermining the angular position of each of these bodies in relation to the other about the common axis of symmetry. These fixing means are produced as follows: the body DB has a diameter which is smaller than the body DA which is hollow and which comprises a protuberance 100 in which the connection side end of the body DB can engage. That protuberance 100 is provided at its end and on its outside face with a thread which co-operates with a nut 102 which is installed round the body DB and which, when it is screwed onto the thread of the protuberance 100, engages the body DB in the protuberance 100. The nut 102 can turn in relation to the body DB in such a way that the angular position of the body DB in relation to the body DA is absolutely not determined by the screwing of the nut 102 on the thread of the protuberance 100. Such a detachable fixing method for the two parts of a connector is well-known.

The cables CA and CB engage in the ends on the cable side of the bodies DA and DB respectively, being fixed to these bodies. The casing of the cables CA and CB are cut inside these bodies so as to free the end sections of the fibres FA and FB; a free space is provided in the body DA round the fibres SA so as to enable a movement of the fibres inside that body.

The ends of the fibres FA and FB are arranged, inside the bodies DA and DB, in holding channels formed between a set of seven rods MA1, MA2, MA3, MA4, MA5, MA6, MA7 for the fibres FA and MB1, MB2, MB3, MB4, MB5, MB6, MB7 for the fibres FB. These rods are arranged in relation to one another and in relation to the fibres which they hold exactly in the same way as the holding rods 26, 28, 30, 32, 34, 36 and 24, respectively, shown in FIG. 3, that is to say, the holding rods MA7 and MB7 fulfull the function of central rods, the others fulfilling the function of external rods. All these holding rods are made of bearing steel and have a same diameter of 646 microns. Their cable side ends are bevelled so as to allow an easier inserting of the fibres in the holding channels which they form. On the connection side, the holding rods have plane and faces which are all situated, for a same set of holding rods, in a same plane which is perpendicular to those rods and to the fibres which they hold. That plane is also perpendicular to the previously mentioned common axis of symmetry for, in each of the bodies DA and DB, the fibres and the holding rods are arranged parallel to the axis of that body, the axis of the central holding rods MA7 and MB7 coinciding with the axis of symmetry of the bodies DA and DB, respectively. Of course the end faces of the fibres FA and FB are also plane and situated in the same end plane as the faces of the holding rods MA and MB on the connection side. The connector makes it possible to put the end faces of the fibres FA and of the holding rods MA in contact with the end faces of the fibres FB and the holding rods MB.

At the time of the forming of the connection, it is necessary, for the fibres SA to come into position in the alignment of the fibres FB, to ensure the guiding of the set of holding rods MA in relation to the set of holding rods MB. For that purpose, six guide rods G1, G2, G3, G4, G5 and G6, having the same shape, the same diameter and being made of the same substance as the holding rods, are provided. Although the number of these guide rods is, here, six, and is preferably at least equal to three when the holding rods are regularly spaced out round the axis of symmetry, it must be understood that this number could be lowered to two. It is, moreover, not necessary for the implementing of the invention, although this would generally be preferable, for all the guide rods to be fixed to the same set of holding rods. It is not, moreover, necessary, although preferable, for the guide rods to have the shape of a body of revolution, that is, a circular cross-section and more particularly for them to have the same diameter as the holding rods. The fact that the guide rods have the shape of a cylinder of revolution makes it possible, however, to obtain, for a low cost, a particularly accurate guiding for similar reasons to those which have been set forth concerning the holding rods. The fact that the holding rods and guide rods all have the same diameter makes the manufacturing of those rods easier.

Each of these guide rods G1, G2, etc., is fixed parallel to the holding rods MB so as to ensure the contact between, on the one hand, the lateral surfaces of two of those holding rods next to each other and, on the other hand, the lateral surface of that guide rode. More precisely, it is possible to distinguish, in each of these guide rods, two portions which are a fixing portion by which contact is permanently provided with the holding rods MB and a guide portion which extends beyond the holding rods MB on the connection side. The length of the fixing portion is perferably greater than that of the guide portion; the end of the guide rods or the guide portion side is provided with a bevelled end portion, that is, the diameter decreases progressively from the diameter of the major portion of that rod up to a smaller end diameter so as to make the engaging of that guide rod in contact with the lateral surfaces of two holdings rods MA next to each other easier when the connection is made. The function of the guide rods fixed to the set of holding rods B is, indeed, to ensure the guiding of the set of holding rods A to aline the holding rods A with the holding rods B. This alignment results from the engaging of the guide portions in contact with the lateral surfaces of two holding rods A simultaneously, these two rods being themselves in contact with each other. When the connection is formed, the guide portions are arranged, in relation to the holding rods A, in the same way as the fixing portions in relation to the holding rods B.

The axes of the outside holding B form, in a plane which is perpendicular to them a regular hexagon whose centre is arranged on the axis of symmetry of the set of holding rods MB. The six guide rods G1, G2, G3, G4, G5 and G6 are also spaced out angularly in a regular way round the same axis of symmetry so that their axes form, in a plane which is perpendicular to them, a regular hexagon whose dimensions are greater than the previously mentioned hexagon. Inasmuch as concerns the angular spacing round that axis of symmetry, the axis of each of the guide rods is arranged between the axes of two holding rods. For example the axis of the guide rod G1 is arranged between the axes of the holding rods MB1 and MB6. The set of holding rods and guide rods is compact, that is, there is no space lost. This ensures the fixing of the relative positions of all these rods when an inward pressure is exerted on those which are the nearest to the outside. The clamping means A previously mentioned therefore ensure the fixing of the holding rods A together and the clamping means B ensure the fixing of the holding rods B together and to the guide rods. It is not necessary to provide other fixing means for those various rods together. This constitutes one of the advantages of the present invention, for these other clamping means, such as cementing or welds, would be in danger of impairing the accuracy of positioning and of guiding obtained according to the invention.

The clamping means A bear against the external holding rods A, whereas the clamping means B bear against the guide rods which themselves each bear against two holding external rods B. The set of guide portions of the guide rods forms a guide tube in which the set of holding rods A can engage. It must nevertheless be observed that, at the time of the engaging, the angular position of the set of holding rods A in relation to the set of holding rods B and of guide rods is not free. There are only six permitted angular positions from one to the other of which it is possible to pass by rotation about the common axis of symmetry. Each of these permitted angular positions is defined by the fact that one of the guide rods, G1, for example, has its guide portion arranged between two holding rods A next to each other, for example, between the rods MA4 and MA5. For another of these permitted angular positions, the same guide rod G1 would have its guide portion arranged between two other holding rods A next to each other, such as MA2 and MA3. In fact, only one of these permitted angular positions is acceptable if it is required that a determined fibre A be connected to the corresponding fibre B, and not to another fibre B.

The pressure exerted by the clamping means on the guide rods and holding rods and the diameters of these rods are chosen in such a way that the fibres FA and FB are positioned with accuracy but without there resulting therefrom any appreciable deformation of these fibres by pression of the holding rods. The results of this is that the longitudinal positioning of these fibres is in danger of not being provided in a sufficiently strong way. That is why it can be an advantage to provide central holding rods MA7 amd MB7 which are longer than the others, so that they protude on the cable side. Thermoretractable sleeves 104 and 106 are then arranged round fibres FA and FB respectively, so as to clamp the fibres on the portions of the central rods MA7 and MB7, respectively, which extend beyond the set of other holding rods.

The previously mentioned clamping means are borne, for the set of holding rods A, by a support SA arranged in a recess 108 of the body DA and, for the set of holding rods B and of guide rods, by a support SB fixed to the body DB and entering the protuberance 100 of the body DA. Each of these supports is drilled, along the common axis of symmetry, with a central space in which are arranged the holding rods and possibly the guide rods. The clamping means are arranged at the periphery of that space. In each of the supports SA and SB, the clamping means are constituted by two collets arranged coaxially round the said central space at a distance from each other along the axis of symmetry. Each of these collets comprises six resilient blades such as 110 extending parallel to the axis of symmetry round the axial space. These blades are separated from each other by slots such as 112 which are substantially parallel to the same axis and are integral with the corresponding support by one of their ends which is therefore fixed, the other end being free. The internal faces of these blades are arranged on a surface of a cylinder of revolution about the axis of symmetry. The outside faces are arranged on a surface of a cone of revolution about the same axis with a distance from that axis greater on the side of the said fixed end. A clamping ring 114 surrounds these plates, bearing on their conical outside faces. A hollow screw 116 surrounds the central space and is screwed into the corresponding support so as to push the clamping ring back towards the fixed end of the plates, this ensuring a movement of the free ends of these plates towards the axis of symmetry and the clamping of the outside holding rods inasmuch as concerns the support A and of the guide rods inasmuch as concerns the support B.

The support SA is connected to the body DA by a spring 118 which surrounds the axis of symmetry and which bears, on the one hand on the wall of the bottom of the recess 108 on the cable side and, on the other hand, on the face of the support SA on the cable side, so as to push that support SA towards the connection end of the body DA. When the body DB is not fixed to the body DA, that is, when the connection is not formed between the cables CA and CB, the spring 1o8 pushed the support SA back up to a stop 120 which if fixed to the inside wall of the recess 108 and which constitutes the boundary between that recess and the protuberance 100. That stop comprises an axial opening which, when the connection is formed, enables the passing of the guide rods G1, G2, G3, G4, G5 and G6. The face of the stop 120 situated on the cable side is conical and has a diameter which decreases on moving towards the connection side.

That stop 120 fulfills the function of a female conical stop and co-operates with a male conical stop, also having the shape of a body of revolution about the common axis of symmetry and constituted by the face of the support SA on the connection side. It then appears that these male and female conical stops have two functions: the first function is to limit the movement of the suport SA under the effect of the spring 118 in the connection direction when the body DB is not fixed to the body DA. The second function is, still when the body DB is not fixed to the body DA, to ensure the centering of the support SA in the body DA. This centering is, indeed, not provided for by the lateral walls of the support SA, for the outside diameter of that support is smaller than the inside diameter of the recess 108. When the cable CB is connected to the cable CA by engaging the body DB and the support SB which is integral therewith into the protuberance 100 of the body DA, the bevelled ends of the guide rods G1, G2, G3, G4, G5 and G6 come into contact first with the holding rods MA. The holding rods MB come into contact with the holding rods MA, by their plane end faces, only when the engaging movement has sufficiently progressed. The support SA is then greatly moved away from the stop 120 by the pressure of these holding rods on one another in the longitudinal direction and the spring 118 is compressed. The spring 118 then ensures a contact pressure between the plane faces of the holding rods MA and those of the holding rods MB so as to ensure that there remains no air gap between these faces, this enabling the putting into contact of the end faces of the fibres SA with those of the fibres SB and therefore ensuring good optical connection. Moreover, that spring 118 exerts only slight efforts in directions perpendicular to the common axis of symmetry. The position of the support SA and of the holding rods MA in relation to the set of holding rods MB is then determined exclusively by the guide rods G1, G2, G3, G4, G5 and G6. The movement of the support SB which constitutes the connection end of a male block formed by the support and by the body DB is limited by the stop 120 whose face on the connection side is plane, perpendicular to the common axis of symmetry and co-operates with the end face of the support SB, which is also plane and perpendicular to the common axis of symmetry.

It has previously been explained that the guide rods G1, G2, G3, G4, G5 and G6 enable the set of holding rods A to take up several angular positions in relation to the set of holding rods B, these various permitted angular positions differing from one another by rotation about the common axis of symmetry. With a view to making it possible to obtain effectively only one of these angular positions permitted by the guide rods when the connection is made, the connector according to the invention comprises, to great advantage, means for previously adjusting the angular position of the supports SA and SB. The aim of these means is to maintain between two limits the relative angular position of these two supports when the bringing together of one of the bodies DA and the other body DB is started. These means for previously adjusting the positioning must act until the guide rods G1, G2, G3, G4, G5 and G6 engage in contact with the holding rods MA1, MA2, MA3, MA4, MA5 and MA6. These two limits differ from each other by rotation about the common axis of symmetry and the difference between them is chosen to be less than the difference which exists between the angular positions permitted by the guide rods. In the example described with reference to FIGS. 4 and 5, these means for previously adjusting the angular positioning comprise a first groove 122 out in the periphery of the male block constituted by the assembly formed by the support SB and the body DB. That first groove is cut parallel to the axis of symmetry, in the suppport SB. It co-operates with a first projection 124, constituted by a key fixed in the inside face of the protuberance 100 of the body SA. The means for previously adjusting the angular positioning comprise, further, two second grooves such as 126, cut parallel to the axis of symmetry, in the lateral wall of the support SA and co-operating with two-second projections formed by keys such as 128 fixed in the inside face of the recess 108 of the body DA.

The connector which has just been described with reference to FIGS. 4 and 5 can be used for cables each comprising six optical fibres. For cables comprising different numbers of fibres, it is nevertheless quite obvious that connectors having a very similar structure, that is, comprising holding rods all having the same diameter and regularly spaced out round an axis of symmetry could be used. The number of holding rods and of guide rods which could be used will be set forth hereinbelow as a function of the number of fibres. In the case of a single fibre, this case corresponding to FIG. 1, there is a central holding channel and three holding rods which are surrounded by three guide rods. In the case of four fibres, there can be a central holding channel with six holding rods and six guide rods forming, in a plane which is perpendicular to them, two equilateral triangles. In the case where there are six fibres, this case corresponding to FIGS. 3 and 5, there is one central holding rod end, in all, seven holding rods surrounded by six guide rods. In the case of twelve fibres, it is possible to use one central rod and a total number of holding rods equal to thirteen, the number of guide rods still being equal to six. In the case of 24 fibres, it is possible to use a central holding rod and, in all, 19 holding rods, the number of guide rods then being 12, spaced out in two hexagons.

Greater numbers are also possible. It must be understood that, in the case of the support A, the clamping means can bear not only on the external holding rods, but also on the holding rods situated at a shorter distance from the axis of symmetry and that, in the case of the support (B), the clamping means can bear not only on the guide rods, but also on the external holding rods. In these cases, the clamping means must no longer have a circular shape round the common axis of symmetry.

It is also possible to produce similar connectors whose cross-section is nevertheless rectangular, for example, instead of being circular.

I claim:

1. In a connector for axially connecting optical fibre elements, said connector comprising:
   at least one optical fibre element and constituting a light guide;
   and guide means for guiding an end section of that one fibre element axially to a position ensuring the connecting thereof to another axially aligned optical fibre element; the improvement comprising:
   at least three holding rods which have the shape of cylinders of revolution;
   clamping means for keeping these holding rods parallel to one another and in contact by their lateral surfaces and forming together, an optical fibre holding channel limited by adjacent portions of the lateral surfaces of these rods;
   and wherein said end section of said one fibre element is arranged in that holding channel, whereby said clamping means provides contact of all rods with that one fibre element without substantially deforming the latter and wherein said guide means includes surface portions engaging said holding rods to guide said one fibre element accurately and without any danger of damage axially to the position ensuring axially aligned connection thereof to said other optical fibre element.

2. The connector according to claim 1, wherein said holding rods are three in number around each fibre, and their diameters are such that each of these rods are in contact by its lateral surface with the lateral surfaces of the other two.

3. The connector according to claim 2, wherein a first group of at least three holding rods are provided for said at least one optical fibre element and a second group of at least three holding rods provided for said other optical fibre element, said holding rods being in the shape of cylinders of revolution; clamping means are provided for respective groups of holding rods for holding the rods parallel to one another and in contact by their lateral surfaces and forming together a holding channel defined by adjacent portions of the lateral surfaces of said rods; and sections of respective fibre elements being arranged in respective holding channels, said clamping means ensuring contact of the holding rods with respective fibre elements without substantially deforming said fibre elements, said guide means comprising at least two guide rods fixed parallel to one group of holding rods associated with one of said optical fibre elements and have free ends extending towards said rods holding said other optical fibre element; the diameters of the holding rods for both fibre elements being equal such that during axial movement of said optical fibre elements towards each other to effect an axial connection therebetween, the guide rods fixed to the holding rods associated with one optical fibre element ensures the axial guiding of the holding rods associated with the other optical fibre elements to bring the optical fibre elements into axial alignment by engaging of the lateral surfaces of the guide rods with those of the holding rods.

4. The connector according to claim 3, wherein said guide rods comprise cylinders of revolution.

5. The connector according to claim 4, wherein the engaging surface portions of said guide means comprise the ends of said guide rods on the same side as their guide portion being provided with chamfered end portions whose diameter decreases progressively starting from the diameter of that rod to a smaller end diameter, so as to facilitate the engaging of those guide rods in contact with the lateral surfaces of the holding rods.

6. The connector according to claim 4, wherein said guide rods are at least three in number, all have the same diameter and are all arranged around a similar first set of holding rods so that their guide portions form a guide tube in which a second set of the other holdings rods can engage; and wherein said clamping means exerts a pressure on the lateral faces of the fixing portions of these guide rods so as to clamp these fixing portions against said second set of holding rods and thus to ensure both the clamping of the second set of holding rods together and the fixing of those guide rods on the second set of holding rods.

7. The connector according to claim 6, wherein the first set of holding rods and the second set of holding rods are each arranged all round an axis of symetry respectively which is parallel thereto, certain of said rods of each set are situated at a same distance from one of these axes of symetry and are angularly regularly spaced all around that axis and have the same diameter and bear on at least one holding rod situated at a shorter distance from that axis and said guide rods all have the same diameter by means of which they ensure the aligning of the axes of symmetry of said sets of holding rods when their guide portions engage in contact with the holding rods.

8. The connector according to claim 6, fixing wherein said rods have portions whose length is greater than that of said guide portions.

9. The connector according to claim 6, wherein a pair of bodies have given axies and are provided with fixing means for fixing one of those bodies to the other in a detachable way with said axes aligned, the ends of two optical connection cables comprising in each case at least one fibre entering respective bodies are fixed to those bodies; supports are connected respectively to the bodies, and have each in its axis, a central space, the periphery of which is provided with clamping means respectively; a set of said holding rods is arranged in the central space of one support and clamped by its clamping means so as to hold each fibre thereof; one set of said guide rods and said holding rods are arranged in the central space of said other support and clamped by clamping means, so as to hold each fibre thereof; at least three holding rods are provided for each set in the shape of cylinders of revolution; said clamping means affecting the sets of holding rods, respectively, for holding these rods parallel to one another and in contact by their lateral surfaces, form together, at least two holding channels, respectively, limited by the adjacent portions of the lateral surfaces of those rods; an end section of each of the fibres B is arranged in a respective holding channel, said clamping means ensuring the contact of the holding rods with those fibres without substantially deforming these latter, said guide means comprises at least two guide rods fixed parallel to said holding rods of said sets so as to ensure the contact between, on the one hand, the lateral surfaces of two of those holding rods of each set which are next to each other and, on the other hand, the lateral surface of a "fixing" portion of the length of that guide rod, a "guide" portion of the length of that guide rod extends beyond the holding rods on the same side as the end of its fibre; the diameter of the holding rods are equal to the diameter of the holding rods, by means of which, when one fibre is brought closer to the other fibre to connect them together, each guide rod fixed to its holding rods ensures the guiding of the other holding rods respectively to bring them into the alignment of the holding rods respectively of said sets engaging its guide portion in contact with the lateral surfaces of two of these other holding rods respectively next to each other; the said holding rods of one set and one fibre have plane end faces in a same plane perpendicular to those rods and to that fibre, whereas the holding rods of said other set and said other fibre have plane end faces in a same plane perpendicular to those rod and to that fibre so that the end faces of said fibres coincide exactly when the end faces of the holding rods of one set are pressed against the end faces of the holding rods of the other set; at least one of the supports being a mobile support, a spring connecting said one support to a corresponding body, said spring being arranged so as to press the mobile support towards the other support, applying the end faces of the holding rods and fibres against each other when the bodies are fixed together.

10. The connector according to claim 9, wherein said mobile support is provided, on the side opposite the other support with a male conical stop surrounding the said central space; said body corresponding to that mobile support being hollow so as to constitute, for that mobile support, a recess having an axial opening on the side opposite the other body; that corresponding body comprising, inside it, a female conical coaxial stop arranged at the periphery of said opening so as to co-operate with the said male conical stop when the bodies are not locked together limiting the movement of that mobile support towards the other support under the effect of said spring and ensuring a suitable position for that support and for the set of holding rods which it carries.

11. The connector according to claim 9, wherein said bodies have the shape of a body of revolution about the axes of these bodies in such a way that the relative angular position of these two bodies about their common axis is not predetermined when the fixing thereof is ensured; the holding rods of one set as well as the holding rods of the other set being in a number greater than three and forming several holding channels, situated at a distance from said axes, in such a way that the said guide rods enable the set of holding rods to take up several angular positions in relation to the set of holding rods, these various permitted angular positions differing from one another by rotation about the common axis of symmetry to set a given holding channel defined by one set of holding rods in alignment with various holding channels previously of said other set; means for adjusting the angular positioning of said supports to hold the relative angular position of said two supports between two limits when the bringing of one of said bodies closer to the other until said guide rods engage in contact with said holding rods is initiated, these two limits differing from each other by rotation about the common axis of symmetry and their difference being chosen to be less than the difference which exits between the angular positions permitted by the guide rods, so that only one of those permitted positions remain possible for said one set of holding rods in relation to the other set of holding rods when one body is fixed to the other body.

12. The connector according toc alim 11, wherein said support other than said mobile support is a fixed support integral with one or the other body to whieh it is connected, the assembly formed by that fixed support and that body with which it is integral forming a male block; said hollow body connected to the mobile support extends beyond said recess containing the mobile support forming a protuberance in which the end of said male block comprising said fixed support engages; said means for previously adjusting the angular positioning comprising at least a first groove cut in the periphery of said male block, parallel to the axis of symmetry and at least a first projection borne by the inside face of said protuberance receivable within that first groove and at least a second groove cut in the periphery of said mobile support parallel to the axis of symmetry and at least a second projection borne by the inside face of said recess and receivable within that second groove.

13. The connector according to claim 11, wherein said clamping means are constituted, for each of the supports by two collets surrounding said axial space at a distance from each other along the axis of symmetry, each of these collets comprising: resiliant blades extending parallel to the axis of symmetry around said central space, being sperated from one another by slots substantially parallel to that axis, and being integral with said support by a fixed end to these blades, the outside faces of these blades being arranged on a conical surface around that axis with a distance from that axis greater on the same side as said fixed end: a clamping ring surrounding these blades bearing on their external conical faces; a hollow screw surrounding said central space and screwing into said support so as to push back said clamping ring towards said fixed end of the blades.

14. The connector according to claim 6, wherein all said holding rods and guide rods are made of hard steel.

* * * * *